United States Patent
Aoyama et al.

(10) Patent No.: US 8,969,468 B2
(45) Date of Patent: Mar. 3, 2015

(54) METHACRYLIC RESIN COMPOSITION AND MOLDED ARTICLE

(75) Inventors: Masataka Aoyama, Chiba (JP); Toshiyuki Ishii, Chiba (JP); Youichi Shinya, Chiba (JP); Kenichi Date, Tokyo (JP)

(73) Assignee: Du Pont-Mitsui Polychemicals Co., Ltd., Tokyo (JP)

( * ) Notice: Subject to any disclaimer, the term of this patent is extended or adjusted under 35 U.S.C. 154(b) by 0 days.

(21) Appl. No.: 14/119,976

(22) PCT Filed: May 23, 2012

(86) PCT No.: PCT/JP2012/063225
§ 371 (c)(1),
(2), (4) Date: Nov. 25, 2013

(87) PCT Pub. No.: WO2012/165264
PCT Pub. Date: Dec. 6, 2012

(65) Prior Publication Data
US 2014/0100322 A1    Apr. 10, 2014

(30) Foreign Application Priority Data

May 27, 2011  (JP) .................................. 2011-119522
Sep. 13, 2011  (JP) .................................. 2011-199851

(51) Int. Cl.
*C08L 33/12* (2006.01)
*C08L 23/26* (2006.01)
*C08L 33/10* (2006.01)

(52) U.S. Cl.
CPC ................. *C08L 33/12* (2013.01); *C08L 23/26* (2013.01); *C08L 33/10* (2013.01)

USPC .......................................... 524/523; 525/228

(58) Field of Classification Search
CPC ....................................................... C08L 33/12
USPC .......................................... 524/523; 525/228
See application file for complete search history.

(56) References Cited

U.S. PATENT DOCUMENTS

| 4,859,727 A * | 8/1989 | Sasaki et al. .................. 524/147 |
| 5,179,168 A | 1/1993 | Hirasawa |
| 5,569,722 A * | 10/1996 | Wang et al. ................. 525/330.2 |
| 2008/0131715 A1 | 6/2008 | Dewa et al. |
| 2008/0132628 A1* | 6/2008 | Hausmann et al. ........... 524/388 |
| 2011/0130519 A1* | 6/2011 | Shinya et al. ................. 525/196 |

FOREIGN PATENT DOCUMENTS

| JP | 3-106954 | 5/1991 |
| JP | 8-134295 | 5/1996 |
| JP | 8-267671 | 10/1996 |

(Continued)

OTHER PUBLICATIONS

International Search Report dated Jun. 26, 2012 filed in PCT/JP2012/063225.

*Primary Examiner* — Vu A Nguyen
(74) *Attorney, Agent, or Firm* — Rankin, Hill & Clark LLP (57) ABSTRACT

The invention is a methacrylic resin composition which includes a methacrylic resin (A) and a saponified polymer (B) that is an alkaline-saponified product of an ethylene-unsaturated carboxylic acid ester copolymer, and the methacrylic resin composition has a concentration of alkali ions of from 0.03 mol/kg to 2.8 mol/kg.

20 Claims, 3 Drawing Sheets

(56) References Cited

FOREIGN PATENT DOCUMENTS

| JP | 9-111130 | 4/1997 |
| JP | 2002-12722 | 1/2002 |
| JP | 3565892 | 9/2004 |
| JP | 2007-131735 | 5/2007 |
| JP | 2007-520586 | 7/2007 |
| JP | 2010-6871 | 1/2010 |
| WO | 2010/013817 | 2/2010 |

* cited by examiner

METHACRYLIC RESIN COMPOSITION AND MOLDED ARTICLE

TECHNICAL FIELD

The invention relates to a methacrylic resin composition and a molded article.

BACKGROUND ART

As electric elements have become common in consumer goods and industrial products formed of various plastics, synthesis fibers, synthesis papers and the like, demand for plastics having antistatic properties as well as antistatic performance such as static electricity-removing property has been increased rapidly.

Those used as such antistatic plastics include ionomer resins.

An ionomer is obtained by partially neutralizing a copolymer of ethylene and an unsaturated carboxylic acid with a metal. As the metal, alkali metals, particularly those containing K, Rb or Cs ion are known to exhibit superior antistatic properties due to ionic conduction thereof. Further, even when such ionomer is not treated with an antistatic agent, the resin itself exhibits conductivity. As a result, such ionomer is known to sustain an antistatic effect semipermanently.

Accordingly, there have been already proposed a number of antistatic materials utilizing an ionomer, molded articles thereof, and their improvements. For example, there is disclosed an antistatic material for polymers which is comprised of an ionomer composition obtained by adding a polyhydric alcohol, such as glycerin or trimethylolpropane, to an ionomer of an ethylene-unsaturated carboxylic acid copolymer whose ion source is an alkali metal such as potassium (for example, see Japanese Patent Application Laid-Open (JP-A) No. 08-134295).

Further, there is disclosed an ionomer composition which is comprised of a mixture containing a component obtained by adding a small amount of a polyhydric alcohol-based compound or an amino alcohol-based compound to a potassium ionomer of an ethylene-unsaturated carboxylic acid copolymer having a neutralization degree of 60% or more and an ethylene-(meth)acrylate-maleic monoester copolymer at as specific blending ratio, the ionomer composition being non-electrostatic, particularly not showing its humidity-dependency (for example, see JP-A No. 2002-12722).

There is disclosed an injection-molded article of a resin composition containing a potassium ionomer of an ethylene-(meth)acrylic acid random copolymer and as a styrene polymer (for example, see Japanese Patent No. 3565892).

By the way, in recent years, there has been a need for a molded article having electrical performance such as prevention or removal of static electricity as well as optical characteristics such as transparency.

The methacrylic resin typified by poly methyl methacrylate (PMMA) is known as a resin having excellent transparency. There has been a need for improvement in antistatic properties of the resin.

SUMMARY OF INVENTION

Technical Problem

The present inventors have found that a resin composition including a methacrylic resin (A) and a saponified polymer that is an alkaline-saponified product of an ethylene-unsaturated carboxylic acid ester copolymer, wherein a concentration of alkali ions in the methacrylic resin composition, preferably a concentration of potassium ions in the methacrylic resin composition is a specific concentration, has excellent transparency equal to the methacrylic resin and shows antistatic properties and solvent resistance. Then, they have completed the invention based on this finding. Particularly, a resin composition having a specific concentration of potassium ions exerts very excellent antistatic properties.

That is, there is a need for a methacrylic resin composition excellent in transparency, antistatic properties, and solvent resistance and a molded article.

Solution to Problem

As a result of extensive studies, the present inventors have accomplished the invention. That is, the invention is as follows:

<1> A methacrylic resin composition including: a methacrylic resin (A); and a saponified polymer (B) that is an alkaline-saponified product of an ethylene-unsaturated carboxylic acid ester copolymer; wherein the methacrylic resin composition has a concentration of alkali ions of from 0.03 mol/kg to 2.8 mol/kg.

<2> A methacrylic resin composition including: a methacrylic resin (A); and a saponified polymer (B) that is an alkaline-saponified product of an ethylene-unsaturated carboxylic acid ester copolymer; wherein the methacrylic resin composition has a concentration of potassium ions of from 0.03 mol/kg to 2.8 mol/kg.

<3> The methacrylic resin composition according to <2>, wherein a content of the methacrylic resin (A) is greater than 50% by mass and less than 100% by mass, the alkaline saponification is potassium saponification, and a content of the saponified polymer (B) having a concentration of potassium ions of 0.1 mol/kg to 5.8 mol/kg is greater than 0% by mass and less than 50% by mass.

<4> The methacrylic resin composition according to any one of <1> to <3>, further including dimer acid.

<5> The methacrylic resin composition according to any one of <1> to <4>, wherein a surface resistivity of a 2-mm thick injection-molded sheet (after aging the sheet at 23° C. and 50% RH for 24 hours, and measured under conditions of an applied voltage of 500 V and a voltage application time of 10 seconds) is $1.0 \times 10^{14}$ Ω/sq. or less.

<6> The methacrylic resin composition according to any one of <2> to <5>, wherein the ethylene-unsaturated carboxylic acid ester copolymer to be subjected to saponification with potassium is an ethylene-acrylic acid ester copolymer.

<7> The methacrylic resin composition according to any one of <2> to <6>, wherein a content of an unsaturated carboxylic acid ester-derived structural unit in the ethylene-unsaturated carboxylic acid ester copolymer to be subjected to saponification with potassium is from 5% by mass to 50% by mass.

<8> The methacrylic resin composition according to any one of <1> to <7>, wherein the methacrylic resin (A) is a methacrylate ester resin.

<9> The methacrylic resin composition according to any one of <1> to <7>, wherein the content of the unsaturated carboxylic acid ester-derived structural unit is from 20% by mass to 35% by mass.

<10> The methacrylic resin composition according to any one of <1> to <9>, wherein a content of the methacrylic resin (A) is from 75% by mass to 97% by mass, and a content of the saponified polymer (B) is from 3% by mass to 25% by mass.

<11> The methacrylic resin composition according to any one of <2> to <10>, wherein a concentration of potassium ions in the saponified polymer (B) is from 1 mol/kg to 3 mol/kg.

<12> The methacrylic resin composition according to any one of <1> to <11>, wherein a saponification degree of the saponified polymer (B) is from 10% to 90%.

<13> A molded article obtained by using the methacrylic resin composition according to any one of <1> to <12>.

Advantageous Effects of Invention

According to the invention, there can be provided a methacrylic resin composition excellent in transparency, antistatic properties, and solvent resistance and a molded article.

BEST MODE FOR CARRYING OUT THE INVENTION

Hereinafter, the embodiments according to the methacrylic resin composition of the invention will be described in detail and specifically. However, the invention is not limited to these examples.

<Methacrylic Resin Composition>

The methacrylic resin composition of the invention is configured to include a methacrylic resin (A) and a saponified polymer (B) that is an alkaline-saponified product of an ethylene-unsaturated carboxylic acid ester copolymer, where the methacrylic resin composition has a concentration of alkali ions of from 0.03 mol/kg to 2.8 mol/kg. The methacrylic resin composition of the invention may further contain other components as needed.

In this regard, the term "to" in any numerical range means that the numerical values before and after the "to" are included, For example, the range "0.03 mol/kg to 2.8 mol/kg" means that a concentration of alkaline ions is "from 0.03 mol/kg to 2.8 mol/kg".

Hereinafter, the methacrylic resin (A) is also referred to as a "component A". Further, the saponified polymer (B) obtained by alkali saponification of an ethylene-unsaturated carboxylic acid ester copolymer is simply referred to as a "saponified polymer (B)" or a "component B".

The methacrylic resin (A) as the component A is known to have high transparency (for example, the total light transmittance is 85% or more) and to be excellent in optical characteristics.

On the other hand, the saponified polymer (B) that is an alkaline-saponified product of an ethylene-unsaturated carboxylic acid ester copolymer as the component B is a compound obtained by saponification of an ethylene-unsaturated carboxylic acid ester copolymer with an alkali metal or alkaline earth metal. The component B mainly has excellent solvent resistance due to the presence of the alkali metal and is also excellent in antistatic properties due to particularly the presence of a potassium metal.

Even if the methacrylic resin (A) having high transparency is mixed with a resin having high antistatic properties in order to obtain a resin composition having excellent transparency and antistatic properties, it has been possible to obtain antistatic properties, however it has been difficult to maintain the transparency. It is found that when the methacrylic resin composition has the above configuration in response to this problem, the resin exhibits antistatic properties and has excellent solvent resistance while maintaining the optical characteristics of the methacrylic resin (A).

This is assumed to be due to the following reason.

As a factor for controlling the transparency of the resin composition, a difference in size, such as particle diameter of the constituent, a refractive index or the like is considered. For example, even if the transparency of a specific constituent is high, when refractive indexes of respective components constituting the resin composition are different, the transparency of the resin composition itself is considered to be impaired.

In a case in which the saponified polymer (B) that is an alkaline-saponified product of an ethylene-unsaturated carboxylic acid ester copolymer is used as the component to constitute the methacrylic resin composition, in addition to the methacrylic resin (A), if the methacrylic resin composition of the invention is configured so that a concentration of alkali ions in the methacrylic resin composition is from 0.03 mol/kg to 2.8 mol/kg, the refractive indexes of the methacrylic resin (A) and the saponified polymer (B) become almost the same.

The details of the procedure for setting the concentration of alkali ions in the methacrylic resin composition to the above range will be described below. For example, a saponified polymer obtained by alkaline saponification of an ethylene-unsaturated carboxylic acid ester copolymer at the saponification degree described below may be used.

For example, in a case in which the poly methyl methacrylate (PMMA) is used as the methacrylic resin (A), an alkaline saponification product of an ethylene-unsaturated carboxylic acid ester copolymer such as an ethylene-(meth)acrylic acid alkyl ester copolymer, particularly a potassium saponification product has almost the same refractive index as that of poly methyl methacrylate (PMMA) (the refractive index of the potassium saponification product when measured by the method in accordance with JIS K7142 "how to determine plastic-refractive index", n=1.49). Therefore, even if the component A and the component B are mixed, high transparency as the methacrylic resin composition is considered to be exerted without impairing the transparency of the PMMA as the component A.

On the other hand, antistatic properties from the component B are hardly impaired by mixing with the component A. As a result, it is considered that the methacrylic resin composition of the invention maintains excellent transparency from the component A and also has excellent antistatic performance.

Particularly, the component B retains antistatic performance in the polymer framework, and thus bleed out is not observed even if the component A is mixed with the component B. A phenomenon such that initial antistatic performance is good, but the performance is reduced with time, which is common to usual antistatic agents, is not observed. Thus, the methacrylic resin composition of the invention has characteristics which can maintain initial antistatic performance permanently.

In the invention, the antistatic properties are determined by the surface resistance value (surface resistivity) and ash adhesion evaluation. The ash adhesion measurement is more sensitive than the surface resistance measurement, so the antistatic properties can be evaluated more strictly by ash adhesion measurement as compared with the surface resistance measurement.

Further, the methacrylic resin composition of the invention is hardly cracked or broken, even if it is in contact with a solvent, and thus it has excellent solvent resistance.

Subsequently, respective components which may be contained in the methacrylic resin composition of the invention will be described.

[Methacrylic Resin (A)]

The methacrylic resin composition of the invention contains a methacrylic resin (A).

Here, the term "methacrylic resin (A)" means a methacrylic acid resin in which the content of the methacrylic acid-derived structural unit is greater than 50% by mass and a methacrylate ester resin in which the content of the methacrylate ester-derived structural unit is greater than 50% by mass.

Examples of the methacrylic acid resin include homopolymers of methacrylic acid (the content of the methacrylic acid-derived structural unit is 100% by mass) and copolymers of methacrylic acid with one or two or more copolymer components.

Examples of the copolymer component which may be copolymerized with methacrylic acid include methacrylate ester, acrylic acid ester, acrylic acid, α-olefin, acrylonitrile, vinylpyridine, vinylmorpholine, vinylpyridone tetrahydrofurfuryl acrylate, N,N-dimethylaminoethyl acrylate, N,N-dimethylacrylamide, 2-hydroxy acrylate, ethylene glycol monoacrylate, glycerin monoacrylate, maleic anhydride, styrene, and α-methylstyrene.

Examples of the methacrylate ester resin include homopolymers of methacrylate ester (the content of the methacrylate ester-derived structural unit is 100% by mass) and copolymers of methacrylate ester with one or two or more copolymer components.

Examples of the copolymer component which may be copolymerized with methacrylate ester include acrylic acid ester, acrylic acid, methacrylic acid, α-olefin, acrylonitrile, vinylpyridine, vinylmorpholine, vinylpyridone tetrahydrofurfuryl acrylate, N,N-dimethylaminoethyl acrylate, N,N-dimethylacrylamide, 2-hydroxy acrylate, ethylene glycol monoacrylate, glycerin monoacrylate, maleic anhydride, styrene, and α-methylstyrene.

As methacrylate ester, methacrylic acid alkyl ester is preferred. The alkyl moiety of methacrylic acid alkyl ester may be linear, branched, or cyclic. Examples thereof include those having 1 to 12 carbon atoms. More specific examples thereof include alkyl groups such as methyl, ethyl, n-propyl, isopropyl, n-butyl, isobutyl, secondary-butyl, and 2-ethylhexyl, and isooctyl.

The alkyl moiety has preferably 1 to 5 carbon atoms, more preferably 1 to 3 carbon atoms. Particularly preferably, it has 1 carbon atom, i.e., methyl methacrylate (MMA).

Only one kind among the examples of the methacrylic resin (A) may be used or two more kinds may be used in combination.

Among the resins, the methacrylate ester resin is preferred, the methyl methacrylate resin is more preferred, and the methyl methacrylate resin which is to homopolymer of poly methyl methacrylate (PMMA) is particularly preferred as the methacrylic resin (A).

The methacrylic resin (A) has preferably a melt flow rate (MFR) at 230° C. and 3.8-kg load [in accordance with JIS K7210-1999] of 0.1 g/10 min to 100 g/10 min, and more preferably 0.5 g/10 min to 50 g/10 min.

The methacrylic resin (A) can be synthesized by an ordinary method.

For example, the methacrylate ester resin may he synthesized by the ACH method using aceto cyanohydrin (ACH) or the isobutylene direct oxidation method using isobutylene contained in the spent BB in which butadiene is separated from the C4 fraction of naphtha.

[Saponified Polymer (B) Obtained by Alkali Saponification to Ethylene-Unsaturated Carboxylic Acid Ester Copolymer]

The methacrylic resin composition of the invention contains the saponified polymer (B) obtained by alkali saponification of an ethylene-unsaturated carboxylic acid ester copolymer.

Examples of the ethylene-unsaturated carboxylic acid ester copolymer which is a material resin used for the saponified polymer (B) may include copolymers of ethylene and an alkyl ester of unsaturated carboxylic acid such as alkyl esters of acrylic acid, alkyl esters of methacrylic acid, alkyl esters of ethacrylic acid, alkyl esters of crotonic acid, alkyl esters of fumaric acid, alkyl esters of maleic acid, monoalkyl esters of maleic acid, alkyl esters of maleic anhydride, alkyl esters of itaconic acid and alkyl esters of itaconic anhydride.

Examples of the alkyl moiety of alkyl ester may include those having 1 to 12 carbon atoms. More specific examples thereof may include alkyl groups such as methyl, ethyl, n-propyl, isopropyl, n-butyl, isobutyl, secondary-butyl, 2-ethylhexyl, and isooctyl.

In the invention, as the unsaturated carboxylic acid ester, methyl ester, ethyl ester, n-butylester, and isobutyl ester of acrylic acid or methacrylic acid are particularly preferred.

In the invention, a particularly preferable ethylene-unsaturated carboxylic acid ester copolymer is an ethylene-(meth)acrylic acid ester copolymer. Particularly, an ethylene-methyl acrylate copolymer, an ethylene-ethyl acrylate copolymer, an ethylene-n-butyl acrylate copolymer, an ethylene-isobutyl acrylate copolymer, an ethylene-methyl methacrylate copolymer, an ethylene-ethyl methacrylate copolymer, an ethylene-n-butyl methacrylate copolymer, and an ethylene-isobutyl methacrylate copolymer are preferred.

A content of the unsaturated carboxylic acid ester-derived structural unit in the ethylene-unsaturated carboxylic acid ester copolymer before saponification is preferably from 5% by mass to 50% by mass, more preferably from 20% by mass to 35% by mass. That is, if the content of the unsaturated carboxylic acid ester-derived structural unit is within the range, a balance among antistatic properties, flexibility, and miscibility with other resins is excellent.

Further, a melt flow rate (MFR) (at 190° C. and 2160-g load) [in accordance with JIS K7120-1999] of the ethylene-unsaturated carboxylic acid ester copolymer before saponification is preferably from 1 g/10 min to 1300 g/10 min.

Further, two or more kinds of the ethylene-unsaturated carboxylic acid ester copolymers before saponification may be mixed for use.

In this regard, "a content of the unsaturated carboxylic acid ester-derived structural unit" in a case in which the unsaturated-carboxylic acid ester copolymer constituting the ethylene-unsaturated carboxylic acid ester copolymer is methyl acrylate is also referred to as "an MA content".

Further, "a content of the unsaturated carboxylic acid ester-derived structural unit" in a case in which the unsaturated-carboxylic acid ester copolymer constituting the ethylene-unsaturated carboxylic acid ester copolymer is ethyl acrylate" is referred to as "an EA content".

Such ethylene-unsaturated carboxylic acid ester copolymer is produced by, for example, high-pressure radical copolymerization which is known in itself.

In the invention, the above ethylene-unsaturated carboxylic acid ester copolymer is subjected to alkaline saponification. Examples of metal ion species of caustic alkali used in the saponification include alkali metals and alkaline earth metals. Among them, alkali metals such as lithium (Li), sodium (Na), potassium (K), rubidium (Rb), and cesium (Cs) are preferred. From the viewpoint of antistatic properties, saponification with potassium is preferred.

In the saponified polymer (B), a concentration of alkali ion present in the resulting saponification product as an alkali carboxylate is preferably from 0.1 mol/kg to 5.8 mol/kg, more preferably from 1 mol/kg to 3 mol/kg.

When a concentration of alkali ion is not lower than the above lower limit, a surface resistivity required for antistatic properties, which is not higher than $10^{14}$ Ω/sq. can be attained. On the other hand, when a concentration is not higher than the above upper limit, an increase in the melt viscosity can be prevented, so that excellent moldability and processability are attained.

From the viewpoint of moldability and processability, the saponified polymer (B) has a melt flow rate (MFR) at 230° C. and 10-kg load (in accordance with JIS K7210-1999) of 0.01 g/10 min to 100 g/10 min, particularly suitably 0.1 g/10 min to 50 g/10 min.

In the invention, among the saponified polymers (B), one in which the molar ratio of the amount of alkali ion present as an alkali carboxylate after saponification is from 0.1 to 0.9 with respect to the molar amount of the total unsaturated carboxylic acid ester group unit in the ethylene-unsaturated carboxylic acid ester copolymer to be subjected to alkaline saponification, namely, the saponified polymer having a saponification degree of 10% to 90%, preferably a saponification degree of 20% to 80%, more preferably a saponification degree of 30% to 70% is preferred from the viewpoint of antistatic properties or miscibility with other resins.

Incidentally, in the invention, since the ester component in the copolymer constituting the saponified polymer (B) is partially altered to an alkali metal salt component by a saponification reaction with an alkali metal, the saponification product is a copolymer which contains an ethylene unit, an unsaturated carboxylic acid ester unit and an unsaturated carboxylic acid alkali metal salt unit, but no free carboxyl group unit.

Even if the alkaline saponification polymer (B) in the invention is blended with the methacrylic resin (A), the polymer can exert antistatic properties without substantially impairing the physical properties, for example, impact resistance typified by the Izod impact strength.

The alkaline saponification of the ethylene-unsaturated carboxylic acid ester copolymer may be performed with a caustic alkali of the like by a method which is known in itself. For example, the alkaline saponification may be performed by melt-mixing an ethylene-unsaturated carboxylic acid ester copolymer with a predetermined amount of a caustic alkali such as alkali hydroxide in a kneading apparatus such as an extruder, kneader or Banbury mixer at a temperature of 100° C. to 250° C. Alternatively, a method in which the ethylene-unsaturated carboxylic acid ester copolymer is melt-homogenized using the above kneading apparatus, and then a predetermined amount of a caustic alkali such as alkali hydroxide is added thereto to allow the ester moiety of the ethylene-unsaturated carboxylic acid ester copolymer to react with the caustic alkali so as to obtain a saponification product can be exemplified.

In the methacrylic resin composition of the invention, from the viewpoints of a balance between high antistatic properties and high transparency, the miscibility of the components A and B, and the solvent resistance, it is preferable that a content of the methacrylic resin (A) is greater than 50% by mass and less than 100% by mass and a content of the saponified polymer (B) is greater than 0% by mass and less than 50 parts by mass, and it is more preferable that a content of the methacrylic resin (A) is from 75% by mass to 97% by mass (from 75% by mass to 97% by mass) and a content of the saponified polymer (B) is from 3% by mass to 25% by mass.

[Dimer Acid]

Preferably, the methacrylic resin composition of the invention further includes at least one of dimer acid or a metal salt of dimer acid from the viewpoint of improving moldability and processability.

The dimer acid is a polycarboxylic acid obtained by a polymerization reaction of two or more molecules of unsaturated fatty acid. The dimer acid is usually obtained as two or more mixtures and used as a mixture in a variety of applications.

Further, the dimer acid can be obtained by dimerization of a linear or branched unsaturated fatty acid having 8 to 12 carbon atoms, and also includes derivatives thereof. Examples of the derivatives of the dimer acid include hydrogenation products. Specifically, for example, a hydrogenated dimer acid obtained by hydrogenating the above dimer acid to reduce unsaturated bond contained therein can be employed.

The fluidity of the saponified polymer (B) is improved by containing such a dimer acid along with the saponified polymer (B).

The dimer acid may also be one obtained by using as a raw material, for example, 3-octenate, 10-undecenoic acid, oleic acid, linoleic acid, elaidic acid, palmitoleic acid, linolenic acid, a mixture of two or more of these acids or an industrially available mixture of these unsaturated carboxylic acids such as tall oil fatty acid, soybean oil fatty acid, palm oil fatty acid, rice bran oil fatty acid or linseed oil fatty acid. These dimer acids may also contain a monomer acid or a trimer acid in as small amount.

Conventionally, the dimer acid can be usually produced by dimerization of an unsaturated fatty acid such as tall oil fatty acid at a high temperature using montmorillonite-type clay as a catalyst.

Examples of the dimer acid include the chain dimer acid represented by Formula (1) below.

[Formula 1]

Formula (1)

In addition to the chain dimer acid represented by Formula (1) above, for example, a mixture containing cyclic dimer acid represented by Formula (2) or (3) below can be obtained.

[Formula 2]

Formula (2)

-continued

[Formula 3]

Formula (3)

Examples of industrially available dimer acid include HARIDIMER 200 and 300 (manufactured by Harima Chemicals, Inc.; TSUNODIME 205 and 395 (manufactured by Tsuno Food Industrial Co., Ltd.); and EMPOL 1026, 1028, 1061 and 1062 (manufactured by Cognis Corporation) and examples of hydrogenated dimer acid include EMPOL 1008 and 1012 (manufactured by Cognis Corporation).

The methacrylic resin composition of invention contains the saponified polymer (B) (component B) as described above. In a case in which the component B and a dimer acid component are melt-mixed at the time of producing the composition, the alkali metal in the component B was undergo a reaction with a part on all of the carboxyl groups in the dimer acid component, yielding a structure of an alkali metal salt of the dimer acid. Thus, an embodiment in which the dimer acid is contained in the methacrylic resin composition of the invention can encompass an embodiment in which it is blended in the form of alkali metal salt of dimer acid. Examples of the alkali metal salt of dimer acid include lithium salts of dimer acids (including partial salts), sodium salts of dimer acids (including partial salts), potassium salts of dimer acids (including partial salts), rubidium salts of dimer acids (including partial salts), and cesium salts of dimer acids (including partial salts). Potassium salts of dimer acids (including partial salts) are preferred.

As for a content of the dimer acid in the methacrylic resin composition of the invention, the total amount of the dimer acid and the above-described, saponified polymer (B) is preferably greater than 0% by mass and less than 50 parts by mass, more preferably from 3% by mass to 25% by mass.

A content of the dimer acid is preferably from 1% by mass to 50% by mass with respect to the total mass of the saponified polymer (B) and the dimer acid.

A content of the dimer acid is 1% by mass or more with respect to the total mass of the saponified polymer (B) and the dimer acid so that the uniform dispersibility of the saponified polymer (B) in the methacrylic resin composition of the invention can be improved. Further, it is possible to give excellent melt fluidity as the methacrylic resin composition [for example, the melt flow rate (MFR) at 230° C. and 10-kg load (in accordance with JIS K7210-1999) is 5 g/10 min or less].

A content of the dimer acid is 50% by mass or less with respect to the total mass of the saponified polymer (B) and the dimer acid so that the melt fluidity of the saponified polymer (B) can be in the range suitable for molding process. A content of the dimer acid is preferably from 2% by mass to 30% by mass, particularly preferably from 3% by mass to 15% by mass with respect to the total mass of the saponified polymer (B) and the dimer acid.

[Concentration of Alkali Ions of Methacrylic Resin Composition]

A concentration of alkali ions in the methacrylic resin composition of the invention is from 0.03 mol/kg to 2.8 mol/kg.

When the methacrylic resin composition is a resin composition including the above-described components A and B, in order to attain an excellent balance between the antistatic properties and the transparency, a concentration of alkali ions in the methacrylic resin composition is in the above range. In a case in which as concentration of alkali ions is the concentration of potassium ions, particularly excellent antistatic properties can be attained.

If a concentration of alkali ions in the methacrylic resin composition of the invention is from 0.03 mol/kg to 2.8 mol/kg, the components A and B can be freely configured in the above-described range. For example, in the method for setting the concentration of potassium ions to the above range, the saponified polymer (B) in which the alkaline saponification is potassium saponification can be used as the component B. The saponified polymer (B) in which the saponification degree of the ethylene-unsaturated carboxylic acid ester copolymer constituting the saponified polymer (B) is from 10% to 90% may be included in the methacrylic resin composition.

On the other hand, in a case in which the saponified polymer (B) obtained by potassium saponification is not used as the component B, a potassium compound such as potassium hydroxide is separately prepared. The potassium compound may be included in the methacrylic resin composition while adjusting the content of the potassium compound according to the contents of the components A and B.

The methacrylic resin composition of the invention may contain various additives in a range that does not impair the object of the invention.

Examples of the additives may include an antioxidant, an antiaging agent, a light stabilizer, a heat stabilizer, an ultraviolet, absorber, a lubricant, an antiblocking agent, a plasticizer, an adhesive, an inorganic filler, a reinforcement fiber such as glass fiber or carbon fiber, a pigment, a dye, a flame retarder, a flame retardant aid, a foaming agent, and a foaming aid.

Further, the composition may contain a small amount of a usual antistatic agent.

Examples of the method for obtaining the methacrylic resin composition include a method in which the methacrylic resin (A), the pre-prepared saponified polymer (B), and components to be added as needed, such as dimer acid, are melt-mixed with heating using an uniaxial extruder, biaxial extruder, Banbury mixer, kneader or the like.

<Molded Article<

The molded article of the invention is formed using the methacrylic resin composition of the invention.

Examples of a method for molding the methacrylic resin composition include various methods such as melt extrusion, injection molding, blow molding, and stretch molding. As described above, the methacrylic resin composition of the invention has excellent antistatic properties and transparency. Thus, specific examples of the molded article include high-molecular type antistatic materials which are transparent.

EXAMPLES

Subsequently, the invention will be described more in detail with reference to the examples. However, the invention is not limited to these examples.

In this regard, the raw materials used in the following examples and comparative examples, synthesized saponified polymers, and evaluation methods of the polymer compositions are as follows.

1. Raw Materials

—Components A [Acrylic Resin (A)]—

PMMA-1

Trade name: (registered trademark) ACRYPET MD, manufactured by Mitsubishi Rayon Co., Ltd.

MFR=6 g/10 min (230° C., 3.8-kg load, in accordance with JIS K7210-1999), concentration of alkali: 0 mol/kg

PMMA-2

Trade name: (registered trademark) ACRYPET VH, manufactured by Mitsubishi Rayon Co., Ltd.

MFR=2 g/10 min (230° C., 3.8-kg load, in accordance with JIS K7210-1999), concentration of alkali: 0 mol/kg

PMMA-3

Trade name: (registered trademark) ACRYPET MF, manufactured by Mitsubishi Rayon Co., Ltd.

MFR=14 g/10 min (230° C., 3.8-kg load, in accordance with JIS K7210-1999), concentration of alkali: 0 mol/kg

PMMA-4

Trade name: (registered trademark) DELPET 80N manufactured by Asahi Kasei Chemicals Corporation.

MFR=2 g/10 min (230° C., 3.8-kg load, in accordance with JIS 7210-1999), concentration of alkali: 0 mol/kg —Components B (B1 to B3 and B6 to B10) and Components B for Comparison (B4 to B5)—

B1

50%-Saponified product of ethylene-methyl acrylate copolymer (ethylene content: 70% by mass, MA content; 30% by mass, MFR=15 g/10 min; 190° C.×2160-g load) with potassium MFR=2 g/10 min (230° C., 10-kg load, in accordance with JIS K7210-1999), concentration of potassium ions: 1.7 mol/kg

B2

Composition obtained by mixing the following B2-A and the following B2-B at a ratio of B2-A/B2-B=85.7/14.3 (% by mass)

MFR=2 g/10 min (230° C., 10-kg load, in accordance with JIS K7210-1999), concentration of potassium ions; 1.46 mol/kg

[B2-A]

50%-Saponified product of ethylene-ethyl acrylate copolymer (ethylene content; 66% by mass, EA content; 34% by mass) with potassium, concentration of potassium ions: 1.70 mol/kg

[B2-B]

Dimer acid [trade name: TSUNODIME T395, manufactured by Tsuno Food Industrial Co., Ltd.]

(Component composition: dimer acid; 76.2% by mass, monomer acid; 10% by mass, trimer acid; 13.8% by mass)

B3

60%-Saponified product of ethylene-ethyl acrylate copolymer (ethylene content; 75% by mass, EA content; 25% by mass, MFR=800 g/10 min; 190° C.×2160-g load) with potassium MFR=27.5 g/10 min (230° C., 10-kg load, in accordance with JIS K7219-1999), concentration of potassium ions: 1.50 mol/kg

B4

High-molecular type antistafic agent, trade name "IRG-ASTAT P18", manufactured by BASF Japan Ltd. (a high-molecular weight mixture based on a polyamide copolymer)

B5

High-molecular type antistatic agent, trade name "PELESTAT NC6321", manufactured by Sanyo Chemical Industries, Ltd. (Polyether ester amide block copolymer)

B6

44%-Saponified product of ethylene-ethyl acrylate copolymer (ethylene content; 75% by mass, EA content; 25% by mass, MFR=250 g/10 min; 190° C.×2160-g load) with potassium MFR=14 g/10 min (230° C., 10-kg load, in accordance with JIS 7210-1999), concentration of potassium ions: 1.10 mol/kg

B7

Composition obtained by mixing the following B7-A and the above B2-B at a ratio of B7-A/B2-B=95/5 (% by mass)

MFR=9 g/10 min (230° C., 10-kg load, in accordance with JIS K7210), concentration of potassium ions: 1.38 mol/kg

[B7-A]

58%-Saponified product of ethylene-ethyl acrylate copolymer (ethylene content; 75% by mass, EA content; 25% by mass, MFR=250 g/10 min; 190° C.×2160-g load) with potassium MFR=2.9 g/10 min (230° C. 10-kg load, in accordance with JIS 7210-1999), concentration of potassium ions: 1.45 mol/kg

B8

Composition obtained by mixing the following B8-A and the above B2-B at a ratio of B7-A/B2-B=90/10 (% by mass)

MFR=45 g/10 min (230° C. 10-kg load, in accordance with JIS K7210), concentration of potassium ions: 1.41 mol/kg

[B8-A]

63%-Saponified product of ethylene-ethyl acrylate copolymer (ethylene content; 75% by mass, EA content; 25% by mass, MFR=250 g/10 min; 190° C.×2160-g load) with potassium MFR=1.7 g/10 min (230° C. 10-kg load, in accordance with JIS 7210-1999), concentration of potassium ions: 1.57 mol/kg

B9

31%-Saponified product of ethylene-ethyl acrylate copolymer (ethylene content; 75% by mass, EA content; 25% by mass, MFR=250 g/10 min; 190° C.×2160-g load) with potassium MFR=45 g/10 min (230° C., 10-kg load, in accordance with JIS 7210-1999), concentration of potassium ions: 0.77 mol/kg B10 (Unsaponified Product for Comparison)

Ethylene-ethyl acrylate copolymer (ethylene content; 81% by mass, EA content; 19% by mass), MFR=5 g/10 min (190° C.×2160-g load)

MFR=120 g/10 min (230° C., 10-kg load, in accordance with JIS 7210-1999), concentration of potassium ions: 0 mol/kg In this regard, the components B1, B2, B2-A, B3, B6, B7, B7-A, B8, B8-A, and B9 (all of which were the saponified polymers (B)) were obtained as follows.

10 kg of an ethylene-acrylic acid ester copolymer (random copolymer) shown in Table 1 was fed to a kneading apparatus as a material resin for preparation of a saponification product (base resin) along with potassium hydroxide (KOH) equivalent to each saponification degree (for example, in the case of B1, 1.15 kg of a KOH reagent with a KOH purity of 85%). Subsequently, the ethylene-acrylic acid ester copolymer and potassium hydroxide were melted in the kneading apparatus, allowed to react, and then extruded to obtain saponified polymers.

In the saponified polymers, the concentration of potassium ion (amount of K ion) present in the form of potassium acrylate was the value [mole/kg] shown in Table 1. Further, the ratio of the molar amount of the alkali metal ion present in the saponification product (percentage: saponification degree) with respect to the molar amount of the total acrylic acid ester group unit in the ethylene-acrylic acid ester copolymer before saponification was also shown in Table 1.

For comparison, the component B10 as an unsaponified product was also shown.

TABLE 1

| Saponified polymer | Ethylene-acrylic acid ester copolymer (random copolymer) | Types of ester | Saponification degree [mol %] | Types of metal | Concentration of metal ion [mol/kg] | MFR [g/10 min] |
|---|---|---|---|---|---|---|
| B1 | Ethylene-methyl acrylate copolymer | MA | 50 | K | 1.70 | 2 |
| B2 | Ethylene-ethyl acrylate copolymer | EA | 50* | K | 1.46 | 2 |
| B3 | Ethylene-ethyl acrylate copolymer | EA | 60 | K | 1.50 | 27.5 |
| B6 | Ethylene-ethyl acrylate copolymer | EA | 44 | K | 1.10 | 14 |
| B7 | Ethylene-ethyl acrylate copolymer | EA | 58* | K | 1.38 | 9 |
| B8 | Ethylene-ethyl acrylate copolymer | EA | 63* | K | 1.41 | 45 |
| B9 | Ethylene-ethyl acrylate copolymer | EA | 31 | K | 0.77 | 45 |
| B10 | Ethylene-ethyl acrylate copolymer | EA | 0 | — | 0.00 | 120 |

In Table 1, the asterisk indicates that the saponification degrees in the column "B2", the column "B7", and the column "B8" are not the physical property values of B2, B7, and B8, but physical properties of B2-A, B7-A, and B8-A as their bases.

The amount of alkali metal ion (metallic ion concentration) in the saponified polymers (B1, B2, B2-A, B3, B6, B7, B7-A, B8, B8-A, and B9) was measured by the following method.

Each sample was demetalized with hydrochloric acid in a xylene/butanol mixed solvent and titrated with a thymol blue indicator to measure the amount (molar amount) of generated carboxy group (COOH). Since the amount (molar amount) of generated carboxy group (COOH) is equal to the molar amount of COOM$^+$, the molar amount of COOM$^+$ per 1 kg of sample (metallic ion concentration) was calculated now the molar amount of generated carboxy group (COOH).

—Production of Methacrylic Resin Composition and Production of Molded Article—

Example 1

The component A and the component B shown in "1. Raw materials" were blended as described in Table 2 below (in Table 2, the unit of the "blending ratio" is by mass) and mixed without melting to obtain a composition 1.

The obtained composition 1 was applied to the following injection molding apparatus and injection-molded under the following conditions to obtain as square shaped sheet of 150 mm×80 mm×2 mm thick (a molded article 1).

—Injection Molding Apparatus and Injection Molding Conditions—

Injection molding apparatus: manufactured by TOSHIBA MACHINE CO., LTD., IS-220F

Molding temperature: 240° C.

Metal mold: metal molds were taken at six points

Metal mold temperature: 50° C.

Examples 2 to 10, 13, and 14 and Comparative Examples 4 to 7, and 9

Each of the components A and each of the components B shown in "1. Raw materials" were blended as described in Table 2 below (in Table 2, the unit of the "blending ratio" is % by mass) and melt-kneaded with a biaxial extruder to obtain compositions 2 to 10, 13, and 14 as well as compositions 104 to 107 and 109.

Square shaped sheets of 150 mm×80 mm×2 mm thick (molded articles 2 to 10, 13, and 14 as well as molded articles 104 to 107 and 109) were obtained in the same manner as described above except that the obtained compositions 2 to 10, 13, and 14 as well as compositions 104 to 107 and 109 were used in place of the composition 1 in the production of the molded article 1 in Example 1.

Comparative Examples 1 to 3, and 8

In Comparative examples 1 to 3 and Comparative example 8, square shaped sheets (molded articles 101 to 103 and 108) were obtained in the same manner as described in Example 1 except that only the components A were used.

Examples 11 and 12

Each of the components A and each of the components B shown in "1. Raw materials" were blended as described in Table 2 below (in Table 2, the unit of the "blending ratio" is % by mass) and mixed without melting to obtain compositions 11 and 12.

The obtained compositions 11 and 12 were applied to the following injection molding apparatus and injection-molded under the following conditions to obtain square shaped sheets of 150 mm×80 mm×2 mm thick (molded articles 11 and 12).

—Injection Molding Apparatus and Injection Molding Conditions—

Injection molding apparatus: manufactured by TOSHIBA MACHINE CO., LTD., IS-220F

Molding temperature: 240° C.

Metal mold: metal molds were taken at six points

Metal mold temperature: 50° C. (chiller temperature)

2. Evaluation Item and Evaluation Method

Sheet shaped molded articles 1 to 14 and molded articles 101 to 109 were subjected to the following evaluation. The evaluation results were shown in Table 2.

[Evaluation of Antistatic-Properties]

1) Surface Resistance Value (Surface Resistivity)

Each molded article was aged at a constant temperature and constant humidity (at 23° C. and 50% RH) for 24 hours. Thereafter, the surface resistance value [Ω/sq.] of each sample was measured using an electric resistance measuring apparatus below (at an applied voltage of 500 V and a voltage application time of 10 seconds). The measurement limit (upper limit of measurement) of the electric resistance measuring apparatus was $1.0 \times 10^{14}$ Ω/sq.

In this regard, the surface resistance value was measured 3 times, and an average thereof was shown in Table 2. As the value of the surface resistance is high, the insulation is high. As the value is low, the conductivity is high. The acceptable range is $1.0 \times 10^{14}$ Ω/sq. or less.

—Electric Resistance Measurement Conditions—

Apparatus used for measurement: manufactured by Mitsubishi Chemical Analytech Co., Ltd., Hiresta-UP MCP-HT450, MCP-JB03

Measurement mode: surface resistance (Surface Resistivity)

Probe: JIS/ASTM (J box U type)

2) Ash Adhesion Test

Electricity of each molded article was removed with an electricity removing blower. A 500-g weight was wrapped with bleached cloth. Each article was rubbed in the same direction 3 times only with the weight. Each molded article was brought close to ashes so that the distance between the sheet surface of each molded article and the ashes was 1 cm. The ash adhesion level was confirmed with naked eyes and determined in accordance with the following criteria.

—Evaluation Criteria—

D: Ashes were adhered to the whole sheet surface.

C: Ash adhesion was observed on the sheet surface and ashes remained even if they were blown.

B: Ashes were slightly adhered to the sheet surface (1 to 2 points), but ashes were removed when they were blown.

A: Ashes were not adhered to the sheet surface.

[Evaluation of Transparency]

The total light transmittance (in accordance with JIS K7361) and the Haze (in accordance with JIS K7105) of each molded article were measured using a haze meter (HM-150, manufactured by MURAKAMI COLOR RESEARCH LABORATORY CO., Ltd).

The total light transmittance and the HAZE of each molded article were measured 3 times, and an average thereof was shown in Table 2. in this regard, in Table 2, the unit of the total light transmittance and the unit of Haze are percentage (%).

The acceptable range of the total light transmittance is 85% or more, while the acceptable range of the Haze is 20% or less.

[Concentration of Potassium Ions of Methacrylic Resin Composition]

The concentration of potassium ions (concentration of K ions) in the methacrylic resin compositions of Examples 1 to 18 and Comparative example 9 was calculated from the blending ratios and the results were shown in Tables 2 and 4.

TABLE 2

| | Composition | | | | | Physical properties | | | |
| | | | | | | Antistatic properties | | Transparency | |
| | Components | | Blending ratio | | Concentration of K ion | Molded article | | | Total light | |
| | A | B | A | B | [mol/kg] | No. | Ash adhesion | Surface resistance | transmittance | Haze |
|---|---|---|---|---|---|---|---|---|---|---|
| Example 1 | PMMA-1 | B1 | 95 | 5 | 0.085 | 1 | B | $1.6 \times 10^{2}$ | 93.3 | 33 |
| Example 2 | PMMA-1 | B1 | 80 | 20 | 0.340 | 2 | A | $3.2 \times 10^{9}$ | 90.9 | 18.5 |
| Example 3 | PMMA-1 | B2 | 90 | 10 | 0.146 | 3 | A | $4.5 \times 10^{11}$ | 90.6 | 4.2 |
| Example 4 | PMMA-1 | B3 | 90 | 10 | 0.150 | 4 | A | $6.0 \times 10^{11}$ | 92.6 | 3.1 |
| Example 5 | PMMA-1 | B3 | 80 | 20 | 0.300 | 5 | A | $4.2 \times 10^{11}$ | 92.0 | 5.3 |
| Example 6 | PMMA-2 | B2 | 90 | 10 | 0.146 | 6 | A | $4.2 \times 10^{10}$ | 89.7 | 8.2 |
| Example 7 | PMMA-3 | B2 | 80 | 20 | 0.292 | 7 | A | $8.0 \times 10^{8}$ | 88.7 | 7.6 |
| Example 8 | PMMA-2 | B6 | 95 | 5 | 0.055 | 8 | C | $4.0 \times 10^{12}$ | 91.6 | 1.7 |
| Example 9 | PMMA-4 | B6 | 95 | 5 | 0.055 | 9 | C | $2.0 \times 10^{12}$ | 91.4 | 1.8 |
| Example 10 | PMMA-4 | B7 | 95 | 5 | 0.069 | 10 | B | $1.0 \times 10^{12}$ | 91.5 | 1.5 |
| Example 11 | PMMA-4 | B7 | 95 | 5 | 0.069 | 11 | B | $8.6 \times 10^{11}$ | 91.6 | 2.3 |
| Example 12 | PMMA-4 | B7-A | 95 | 5 | 0.073 | 12 | B | $3.0 \times 10^{11}$ | 91.9 | 2.4 |
| Example 13 | PMMA-1 | B8 | 90 | 10 | 0.141 | 13 | B | $3.0 \times 10^{10}$ | 91.0 | 3.9 |
| Example 14 | PMMA-2 | B9 | 90 | 10 | 0.077 | 14 | C | $2.0 \times 10^{12}$ | 90.4 | 6.3 |
| Comparative example 1 | PMMA-1 | — | 100 | — | — | 101 | D | Resin over | 94.2 | 1.1 |
| Comparative example 2 | PMMA-2 | — | 100 | — | — | 102 | D | Resin over | 92.6 | 0.3 |
| Comparative example 3 | PMMA-3 | — | 100 | — | — | 103 | D | Resin over | 92.6 | 0.5 |
| Comparative example 4 | PMMA-1 | B4 | 80 | 20 | 0 | 104 | A | $3.7 \times 10^{10}$ | 73.9 | 66.1 |
| Comparative example 5 | PMMA-1 | B5 | 90 | 10 | 0 | 105 | A | $3.0 \times 10^{11}$ | 61.3 | 45.4 |
| Comparative example 6 | PMMA-2 | B5 | 90 | 10 | 0 | 106 | A | $3.5 \times 10^{11}$ | 65.1 | 35.7 |

TABLE 2-continued

| | Composition | | | | | Physical properties | | | |
| | | | | | | Antistatic properties | | Transparency | |
| | Components | | Blending ratio | | Concentration of K ion | Molded article | Ash | Surface | Total light | |
| | A | B | A | B | [mol/kg] | No. | adhesion | resistance | transmittance | Haze |
|---|---|---|---|---|---|---|---|---|---|---|
| Comparative example 7 | PMMA-3 | B5 | 90 | 10 | 0 | 107 | A | $2.9 \times 10^{11}$ | 59.2 | 61.7 |
| Comparative example 8 | PMMA-4 | — | 100 | — | — | 108 | D | Resin over | 92.5 | 1.1 |
| Comparative example 9 | PMMA-2 | B10 | 90 | 10 | 0 | 109 | D | Resin over | 78.4 | 34.8 |

As is clear from Table 2, the molded articles 101 to 103 and 108 of Comparative examples 1 to 3 and Comparative example 8 which were comprised of only the methacrylic resin (A) had high transparency. However, ashes were adhered thereto and the surface resistance was greater than the measurement limit. Thus, the antistatic properties required in the invention were not exerted. On the other hand, the molded articles 104 to 107 of Comparative examples 4 to 7 including each of the components A and each of the components B for comparison have antistatic properties. However, transparency equal to that of the methacrylic resin was not obtained.

However, the molded articles 1 to 7 of Examples 1 to 7 including each of the components A and each of the components B maintained, high transparency equal to that of the methacrylic resin and exhibited excellent antistatic properties. Particularly, the molded articles 3, 6, and 7 of Examples 3, 6, and 7 in which the component B2 including dimer acid was used had excellent antistatic properties in comparison with other examples having the same blending ratio of A:B. The molded article 7 of Example 7 having particularly a large amount of dimer acid exhibited particularly excellent antistatic properties among, all the examples.

Thus, according to the invention, there can be obtained one having as total light transmittance of 85% or more, particularly a total light transmittance of 88% to 95%. Further, there can be obtained one having a Haze of 20% or less, particularly a Haze of 20% to 3%.

<Evaluation of Solvent Resistance>

Examples 15 to 18, and Comparative Example 10

As for Examples 15 to 18 and Comparative example 10, molded articles 15 to 18 and molded article 110 were produced in the following manner. The solvent resistance of the respective molded articles was evaluated.

—Production of Test Piece (Molded Article)—

In Examples 15 to 18, each of the components A and each of the components B were blended as shown in Table 4 below (in Table 4, the unit of the "blending ratio" is % by mass) and mixed to obtain compositions of Examples 15 to 18. In Examples 15 to 18, mixing of each of the components A and each of the components B in the case of mixing without melting is indicated by "Dry" in the column "specification of mixing" of the column "composition" in Table 4. Meanwhile, mixing in the case of melting and mixing is indicated by "Melt" in the column "specification of mixing" of the column "composition" in Table 4.

In Comparative example 10, only the component A shown in Table 4 was used.

The obtained compositions of Examples 15 to 18 or the component A of Comparative example 10 were applied to the following injection molding apparatus and injection-molded under the following conditions to obtain dumbbell-shaped test pieces (175 mm in length×20 mm in width (parallel portion; 10 mm)×3 mm in thickness (molded articles 15 to 18 and molded article 110).

—Injection Molding Apparatus and Injection Molding Conditions—

Injection molding apparatus: manufactured by TOSHIBA MACHINE CO., LID., IS-220F

Molding temperature: 240° C.

Metal mold temperature: 50° C.

—Evaluation Method—

Figure 1A:
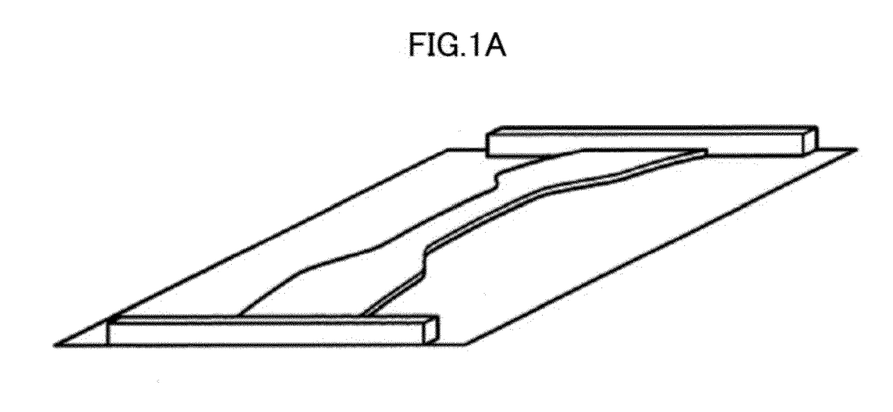
FIG. 1A is a perspective view schematically showing a rising-up state of a test piece in the evaluation of solvent resistance in Examples.
Figure 1B:
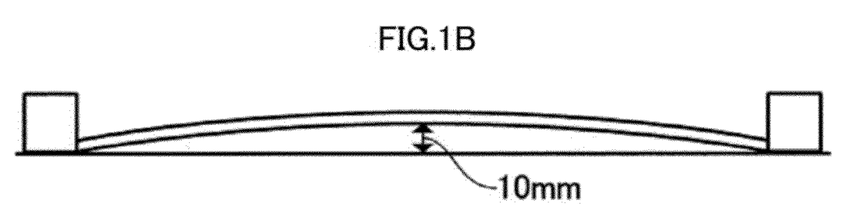
FIG. 1B is a side view schematically showing the rising-up state of the test piece in the evaluation of solvent resistance in the Examples.

The obtained test piece having a length of 175 mm was bent into an arch shape so that a distance between one edge side in the length direction and the other edge side was 125 mm and a rising-up height of the central portion was 10 mm, resulted in the addition of a distortion (FIGS. 1A and 1B). 2 to 3 ml of the solvents shown in Tables 3 and 4 were dropped onto the test piece in that state with a syringe, and the appearance of the test piece was observed with naked eyes.

Figure 2:
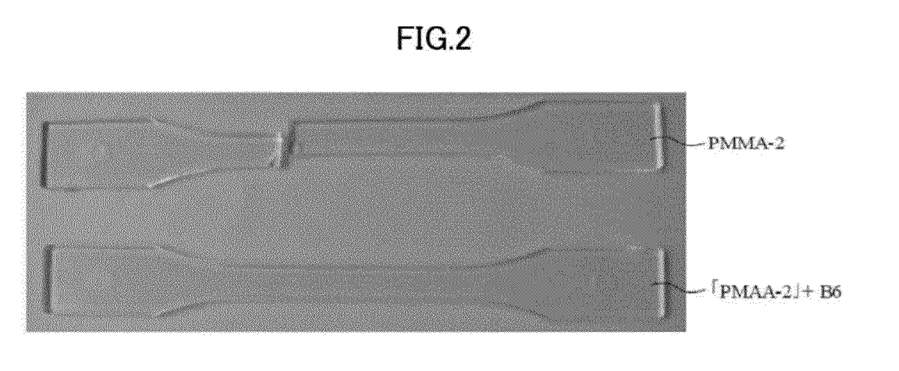
FIG. 2 is a photograph showing the state of test pieces after the evaluation of solvent resistance.

It was evaluated used on the following evaluation criteria. The evaluation results are shown in Table 4. Further, FIG. 2 shows the results in which tetrahydrofuran (THF) was dropped onto the molded article 110 and the molded article 18. The PMMA-2 shown at the upper portion of FIG. 2 is the molded article 110 and the "PMAA-2"+B6 shown at the lower portion of FIG. 2 is the molded article 18.

—Evaluation Criteria—

Rank 1: breakage was observed.

Rank 2: cracks were observed, but no breakage was observed.

Rank 3: cracks were not observed.

TABLE 3

| | Melting point | Boiling point |
|---|---|---|
| Ethanol (EtOH) | −114.2° C. | 78.4° C. |
| Isopropanol (iPA) | −89.5° C. | 82.4° C. |
| Tetrahydrofuran (THF) | −108.5° C. | 66.0° C. |
| Ethyl acetate | −86.6° C. | 77.1° C. |
| Methyl ethyl ketone (MEK) | −86.0° C. | 79.5° C. |
| Toluene | −93.0° C. | 110.6° C. |
| Xylene | −48.0° C. | 139.0° C. |

TABLE 4

| | Composition | | | | | | Solvent | | | | | | |
|---|---|---|---|---|---|---|---|---|---|---|---|---|---|
| | Components | | Blending ratio | | Concentration of K ion | Specification of mixing | Molded article No. | | | | Ethyl acetate | | | |
| | A | B | A | B | [mol/kg] | | | EtOH | iPA | THF | | MEK | Toluene | Xylene |
| Comparative example 10 | PMMA-2 | — | 100 | — | — | — | 110 | 1 | 1 | 1 | 2 | 2 | 1 | 1 |
| Example 15 | PMMA-2 | B2 | 95 | 5 | 0.073 | Dry | 15 | 2 | 2 | 3 | 3 | 3 | 1 | 1 |
| Example 16 | PMMA-2 | B2 | 90 | 10 | 0.146 | Dry | 16 | 3 | 3 | 3 | 3 | 3 | 3 | 3 |
| Example 17 | PMMA-2 | B2 | 90 | 10 | 0.146 | Melt | 17 | 3 | 3 | 3 | 3 | 3 | 3 | 3 |
| Example 18 | PMMA-2 | B6 | 90 | 10 | 0.110 | Melt | 18 | 3 | 3 | 3 | 3 | 3 | Unevaluated | 3 |

As is clear from Table 4 and FIG. 2, the molded article 110 of Comparative example 10 which was comprised of only the component A was cracked due to a large amount of droplets of the solvent.

However, the molded articles 15 to 18 of Examples 15 to 18 containing the components A and B were not cracked by THF, ethyl acetate, and MEK as compared with the molded article 110. Particularly, the molded articles 16 and 17 of Examples 16 and 17 containing 10% or more of the component B were not cracked by any solvent used for the evaluation of solvent resistance, and thus showed excellent solvent resistance.

The disclosure of Japanese Patent Application Nos. 2011-119522 and 2011-199851 are incorporated herein by reference in their entireties.

All documents, patent applications, and technical standards described in the present specification are incorporated herein by reference to the same extent as if each individual document, patent application, or technical standard were specifically and individually indicated to be incorporated by reference.

The invention claimed is:

1. A methacrylic resin composition comprising:
    a methacrylic resin (A); and
    a saponified polymer (B) that is an alkaline-saponified product of an ethylene-unsaturated carboxylic acid ester copolymer,
    wherein the methacrylic resin composition has a concentration of alkali ions of from 0.03 mol/kg to 2.8 mol/kg.

2. A methacrylic resin composition comprising:
    a methacrylic resin (A); and
    a saponified polymer (B) that is an alkaline-saponified product of an ethylene-unsaturated carboxylic acid ester copolymer,
    wherein the methacrylic resin composition has a concentration of potassium ions of from 0.03 mol/kg to 2.8 mol/kg.

3. The methacrylic resin composition according to claim 2, wherein a content of the methacrylic resin (A) is greater than 50% by mass and less than 100% by mass, the alkaline saponification is potassium saponification, and a content of the saponified polymer (B) having a concentration of potassium ions of 0.1 mol/kg to 5.8 mol/kg is greater than 0% by mass and less than 50% by mass.

4. The methacrylic resin composition according to claim 1, further comprising dimer acid.

5. The methacrylic resin composition according to claim 1, wherein a surface resistivity of a 2-mm thick injection-molded sheet (after aging the sheet at 23° C. and 50% RH for 24 hours, and measured under conditions of an applied voltage of 500 V and a voltage application time of 10 seconds) is $1.0 \times 10^{14}$ Ω.sq. or less.

6. The methacrylic resin composition according to claim 1, wherein the ethylene-unsaturated carboxylic acid ester copolymer to be subjected to saponification with potassium is an ethylene-acrylic acid ester copolymer.

7. The methacrylic resin composition according to claim 2, wherein a content of an unsaturated carboxylic acid ester-derived structural unit in the ethylene-unsaturated carboxylic acid ester copolymer to be subjected to saponification with potassium is from 5% by mass to 50% by mass.

8. The methacrylic resin composition according to claim 1, wherein the methacrylic resin (A) is a methacrylate ester resin.

9. The methacrylic resin composition according to claim 7, wherein the content of the unsaturated carboxylic acid ester-derived structural unit is from 20% by mass to 35% by mass.

10. The methacrylic resin composition according to claim 1, wherein a content of the methacrylic resin (A) is from 75% by mass to 97% by mass, and a content of the saponified polymer (B) is from 25% by mass to 3% by mass.

11. The methacrylic resin composition according to claim 3, wherein a concentration of potassium ions in the saponified polymer (B) is from 1 mol/kg to 3 mol/kg.

12. The methacrylic resin composition according to claim 1, wherein a saponification degree of the saponified polymer (B) is from 10% to 90%.

13. A molded article obtained by using the methacrylic resin composition according to claim 1.

14. The methacrylic resin composition according to claim 2, further comprising dimer acid.

15. The methacrylic resin composition according to claim 2, wherein a surface resistivity of a 2-mm thick injection-molded sheet (after aging the sheet at 23° C. and 50% RH for 24 hours, and measured under conditions of an applied voltage of 500 V and a voltage application time of 10 seconds) is $1.0 \times 10^{14}$ Ω.sq. or less.

16. The methacrylic resin composition according to claim 2, wherein the ethylene-unsaturated carboxylic acid ester copolymer to be subjected to saponification with potassium is an ethylene-acrylic acid ester copolymer.

17. The methacrylic resin composition according to claim 2, wherein the methacrylic resin (A) is a methacrylate ester resin.

18. The methacrylic resin composition according to claim 2, wherein a content of the methacrylic resin (A) is from 75% by mass to 97% by mass, and a content of the saponified polymer (B) is from 25% by mass to 3% by mass.

19. The methacrylic resin composition according to claim 2, wherein a saponification degree of the saponified polymer (B) is from 10% to 90%.

20. A molded article obtained by using the methacrylic resin composition according to claim 2.

* * * * *